(12) United States Patent
Takahashi

(10) Patent No.: US 9,370,951 B2
(45) Date of Patent: Jun. 21, 2016

(54) PRINTING CONTROL APPARATUS, PRINTING CONTROL METHOD, AND PRINTING CONTROL PROGRAM

(75) Inventor: Tadashi Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 12/784,853

(22) Filed: May 21, 2010

(65) Prior Publication Data

US 2010/0315663 A1   Dec. 16, 2010

(30) Foreign Application Priority Data

Jun. 16, 2009 (JP) ................................. 2009-143527

(51) Int. Cl.
| | |
|---|---|
| G06K 15/00 | (2006.01) |
| B41J 29/38 | (2006.01) |
| B41J 11/48 | (2006.01) |
| B41J 15/04 | (2006.01) |
| G06K 15/16 | (2006.01) |
| G06K 15/02 | (2006.01) |

(52) U.S. Cl.
CPC ................ *B41J 29/38* (2013.01); *B41J 11/485* (2013.01); *B41J 15/042* (2013.01); *G06K 15/00* (2013.01); *G06K 15/02* (2013.01); *G06K 15/16* (2013.01); *H04N 2201/0094* (2013.01)

(58) Field of Classification Search
USPC .............................. 358/1.15, 1.16, 1.13, 1.14
See application file for complete search history.

(56) References Cited

U.S. PATENT DOCUMENTS

| | | | |
|---|---|---|---|
| 6,856,418 B2* | 2/2005 | Cheney ......................... | 358/1.15 |
| 2004/0125397 A1* | 7/2004 | Adkins et al. ................ | 358/1.14 |
| 2008/0106762 A1* | 5/2008 | Mullender et al. ........... | 358/1.16 |

FOREIGN PATENT DOCUMENTS

| | | |
|---|---|---|
| JP | 04-149571 A | 5/1992 |
| JP | 07-017648 A | 1/1995 |
| JP | 10-20585 A | 1/1998 |
| JP | 10-207305 A | 8/1998 |
| JP | 2005-298102 A | 10/2005 |

* cited by examiner

*Primary Examiner* — Vu B Hang
(74) *Attorney, Agent, or Firm* — Canon USA, Inc. I.P. Division

(57) ABSTRACT

A printing control apparatus for printing an image on a recording medium of a plurality of types of recording mediums set in any of a plurality of storage units by conveying the recording medium to a printing position includes a determination unit configured to determine a used amount for each type of recording medium, and a display control unit configured to display on a display device information for guiding a high usage type recording medium to be set in a storage unit which has a short conveyance distance to the printing position among the plurality of the storage units based on the used amounts determined by the determination unit.

22 Claims, 7 Drawing Sheets

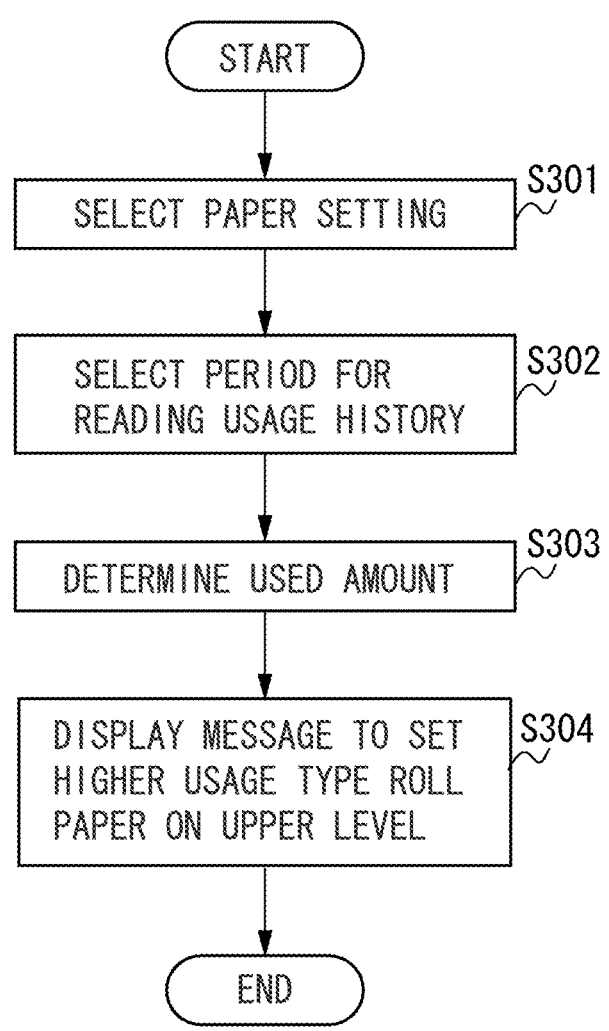

FIG. 4

| TYPE | PLAIN PAPER A0 | PLAIN PAPER B0 | GLOSSY PAPER A0 | COATED PAPER A0 |
|---|---|---|---|---|
| AMOUNT USED IN ONE MONTH | 300m | 100m | 200m | 50m |
| CUMULATIVE TOTAL | 4500m | 200m | 250m | 50m |

| PAPER SETTING | | | | |
|---|---|---|---|---|
| RECOMMENDED TO SET AS FOLLOWS (PRINTING START OF HIGHER USAGE ROLL PAPER WILL BE QUICKER) | | | | |
| | | ROLL PAPER STORAGE UNIT 1 | ROLL PAPER STORAGE UNIT 2 | ROLL PAPER STORAGE UNIT 3 |
| RECOMMENDED PAPER TYPE SETTING | | PLAIN PAPER A0 | GLOSSY PAPER A0 | PLAIN PAPER B0 |
| AMOUNT USED IN ONE MONTH | | 300m | 200m | 100m |

PRINTING CONTROL APPARATUS, PRINTING CONTROL METHOD, AND PRINTING CONTROL PROGRAM

BACKGROUND OF THE INVENTION

1. Field of the Invention

The present invention relates to a printing control apparatus, and a control method and computer-readable storage medium thereof for printing an image on a recording medium stored in any of a plurality of storage units.

2. Description of the Related Art

Conventionally, a printer for printing an image on a continuous sheet of paper such as roll paper as a recording medium is known. In such a printer, a plurality of rolls of roll paper may be simultaneously set in a plurality of storage units, and printing may be performed on any of the rolls of roll paper by switching the storage unit feeding the roll paper (e.g., see Japanese Patent Application Laid-Open No. 10-20585).

When printing is executed by switching the storage unit serving as a feeding source of the recording medium as in Japanese Patent Application Laid-Open No. 10-20585, a distance that the recording medium is conveyed to a image recording position is different depending on the storage unit. More specifically, a storage unit which is far from the image recording position has a long conveyance distance, while a close storage unit has a short conveyance distance. Further, the longer the conveyance distance is, the more time it takes from the start of conveyance until the image is printed.

SUMMARY OF THE INVENTION

The present invention is directed to a printing control apparatus and a control method thereof. Further, the present invention is directed to a printing control apparatus and a control method thereof which can efficiently print an image when printing an image on a recording medium set in any of a plurality of storage units.

According to an aspect of the present invention, a printing control apparatus for printing an image on a recording medium of a plurality of types of recording mediums set in any of a plurality of storage units by conveying the recording medium to a printing position includes a determination unit configured to determine a used amount for each type of recording medium, and a display control unit configured to display on a display device information for guiding a high usage type recording medium to be set in a storage unit which has a short conveyance distance to the printing position among the plurality of the storage units based on the used amounts determined by the determination unit.

According to another aspect of the present invention, a method for controlling a printing control apparatus for printing an image on a recording medium of a plurality of types of recording mediums set in any of a plurality of storage units by conveying the recording medium to a printing position includes determining a used amount for each type of recording medium, and displaying on a display device information for guiding a high usage type recording medium to be set in a storage unit which has a short conveyance distance to the printing position among the plurality of the storage units based on the determined used amount for each recording medium type.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating a processing flow according to the exemplary embodiment.

FIG. 4 illustrates a roll paper usage history screen and a paper setting screen.

DESCRIPTION OF THE EMBODIMENTS

Various exemplary embodiments, features, and aspects of the invention will be described in detail below with reference to the drawings.

Figure 1:
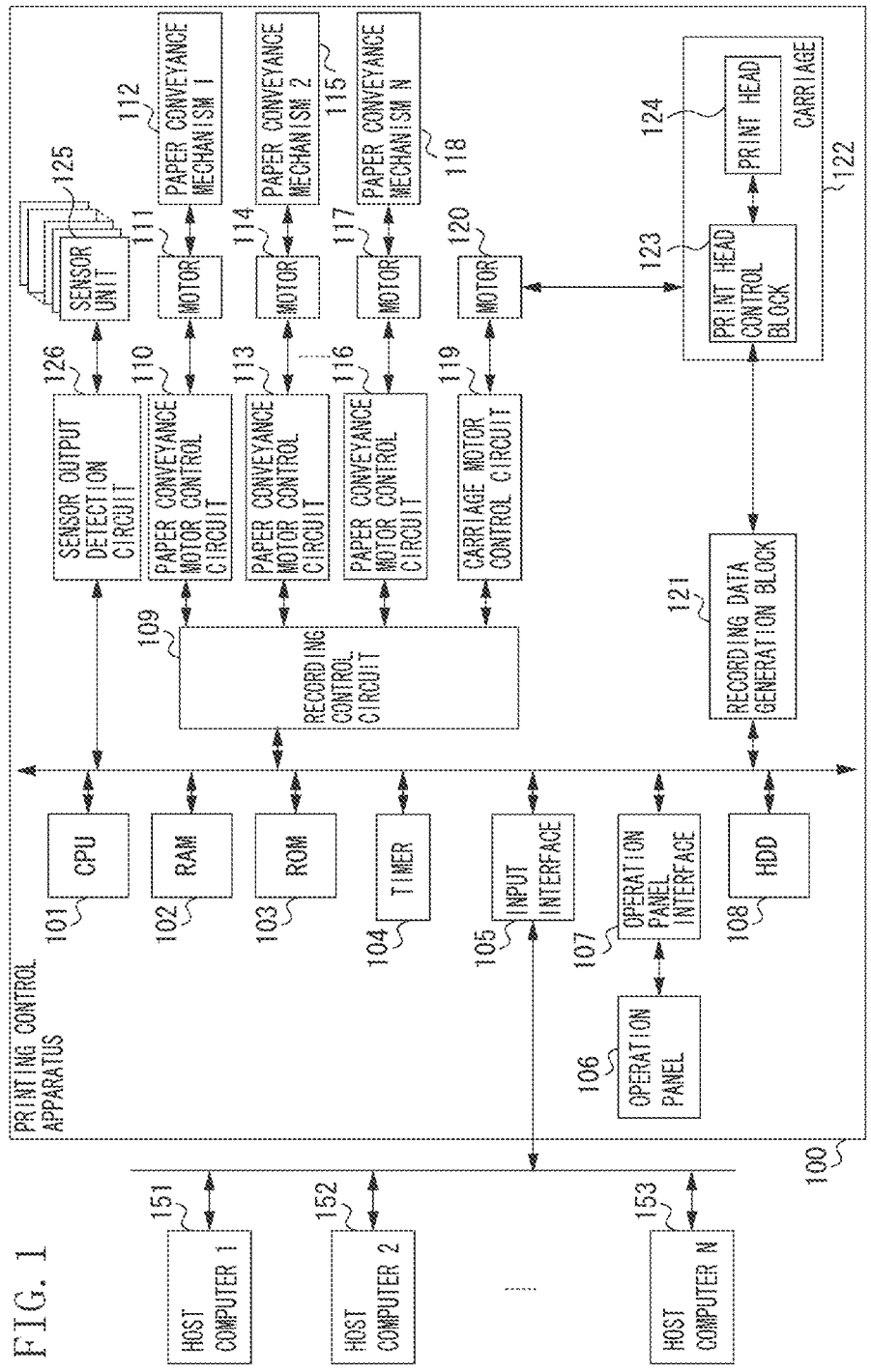
FIG. 1 is a block diagram illustrating a configuration of a printing control apparatus according to an exemplary embodiment of the present invention.

FIG. 1 is a block diagram illustrating a configuration of a printing control apparatus for printing an image on a recording medium which is an example of an exemplary embodiment according to the present invention. In the present exemplary embodiment, a printing control apparatus 100 which is configured as integration (in one housing) of a section (units 101 to 108 in FIG. 1) for controlling a print job and a printing mechanism section (units 109 to 126 in FIG. 1) for executing printing will be described as an example. However, the present exemplary embodiment is not limited to this example. The printing control apparatus may be configured so that the section controlling the print job and the printing mechanism section are separated (in separate housings). A printing control apparatus which is separated from the printing mechanism section can be realized by a print server connected with the printing mechanism section via a network, or a printer controller connected with the printing mechanism section via a local interface.

Further, in the example illustrated in FIG. 1, printing is performed based on a print job received from host computers 151, 152, and 153. However, the printing control apparatus may further include a scanner, a copy function for copying an image from the scanner, and other functions. In addition, the print job is not limited to a print job which is received from a terminal on a network. A print job received via a local interface or via some other reception method can also be used.

In the present exemplary embodiment, an example is described in which roll paper which is a continuous sheet is used as the recording medium. However, the present exemplary embodiment is not limited to a recording medium which is wound in a roll shape. Further, although the following example is described with the roll paper as the recording medium, the recording medium material is not limited to paper. Various other materials capable of being conveyed to a printing position may be used, such as cloth, a film and the like. Further, in addition to a continuous sheet, the printing control apparatus may print an image on a cut sheet set in a cassette. A plurality of cassettes may be provided, and the image may be printed on only the cut sheet set in the cassettes.

Further, although an inkjet method is described as the printing method, other methods may be used, such as sublimation printing, electrophotographic printing, and the like.

As illustrated in FIG. 1, a bus connects a central processing unit (CPU) 101, a random access memory (RAM) 102, a read-only memory (ROM) 103, a timer 104, an input interface (I/F) 105, an operation panel I/F 107, a hard disk drive (HDD) 108, a recording control circuit 109, a recording data generation block 121, and a sensor output detection circuit 126.

In FIG. 1, the CPU 101 controls an overall operation of the printing control apparatus 100 by loading a program stored in the ROM 103 into the RAM 102. In addition to be used as a work area for the CPU 101, the RAM 102 stores various setting values. The timer 104 measures the time and counts how much time has elapsed from a specified time point. The input interface 105 connects the printing control apparatus 100 to a network, and receives a print job from the host computers 151 to 153 via the network.

In the present exemplary embodiment, there are three host computers are illustrated, however the number of the host computers is not limited to this. An arbitrary number of host computers may be used. Further, the input interface 105 may be a local interface.

The host computers 151 to 153 can be realized by general purpose personal computers. The host computers 151 to 153 include a CPU, ROM, RAM, HDD, a display, a keyboard, and the like. A printer driver, an operating system (OS), and the like for executing printing on the printing control apparatus 100 are installed in the HDD of the host computers 151 to 153. A program used for the printer driver is read from the HDD, loaded into the RAM, and executed by the CPU. The host computers 151 to 153 convert data generated by various applications into print data that the printing control apparatus 100 can handle with the printer driver, and then send the print data as a print job to the printing control apparatus 100.

An operation panel 106 receives an operation from a user and displays information which needs to be provided to the user. The operation panel 106 can take various forms which include functions of, for example, receiving an operation from the user using a touch panel and a hard key, and indicating information to the user by displaying the information on a touch panel, or on a dedicated display panel, or turning on and off a lamp.

The operation panel interface 107 transmits the contents of the operation performed by the user using the operation panel 106 to the CPU 101, and transmits to the operation panel 106 the contents received from the CPU 101 which need to be displayed on the operation panel 106. The CPU 101 performs display control for displaying various pieces of information on the operation panel 106. The HDD 108 writes various kinds of data in a built-in hard disk, and reads various kinds of data from the hard disk.

The recording control circuit 109 controls printing of an image by controlling feeding from the roll paper set in a roll paper storage unit (hereinafter, "storage unit") and operation of a carriage 122 based on an instruction from the CPU 101. Further, the recording control circuit 109 performs timing adjustment to synchronize feeding from a selected roll from the plurality of rolls of the roll paper with scanning by the carriage 122.

A paper conveyance motor control circuit 110 controls an operation of a motor 111 for conveying the roll paper. The motor 111 conveys the roll paper to an image recording position by rotating a core around which the roll paper is wound. The motor 11 also takes up the roll paper by rotating in reverse. A paper conveyance mechanism 112 enables printing of an image on the roll paper by using a conveyance roller or the like to convey the roll paper based on an reciprocal operation of the carriage 122. Paper conveyance motor control circuits 113 and 116 are the same as the paper conveyance motor control circuit 110, motors 114 and 117 are the same as the motor 111, and paper conveyance mechanisms 115 and 118 are the same as the paper conveyance mechanism 112.

The printing control apparatus 100 includes N storage units. Each of N rolls of roll paper can be simultaneously set in each of the storage units. Printing can be executed by appropriately switching the roll paper to be used. The simultaneously set rolls of roll paper may have different sheet widths (sizes) or be different kinds of sheet. The roll paper can be mounted in and removed from any of the plurality of storage units based on an instruction from the user. When the user sets the roll paper in the respective storage units, the roll paper is in a conveyable state by the paper conveyance mechanism. Each storage unit may be configured such that the roll paper is set in a box such as a cassette, or such that a rod-like object is simply inserted in the core of the roll paper. In either case, the storage unit configuration is not limited as long as a position for keeping the roll paper on standby is determined, and the specified roll paper can be conveyed to the printing position. Information about the size (width) and the material (sheet type) of the roll paper set in each storage unit is stored in the RAM 102 based on an instruction from the operation panel 106. Based on the stored information, the CPU 101 determines the type of roll paper which is set in each storage unit. The CPU 101 can control a cutter (not illustrated) to cut the roll paper on which printing is executed.

A carriage motor control circuit 119 controls an operation of a motor 120 which causes the carriage 122 to reciprocate. The motor 120 repeatedly causes the carriage 122 to reciprocate over the width of the roll paper. The carriage 122 includes a print head control block 123 and a print head 124. Based on control from the print head control block 123, the carriage 122 prints an image on the roll paper by discharging ink from the print head 124 while reciprocally moving.

A recording data generation block 121 generates data indicating ON/OFF of discharging of the ink by the print head 124 based on input image data, and supplies the generated data to the print head control block 123. Based on the supplied data, the print head control block 123 controls the print head 124 so that the image is printed.

A sensor unit 125 detects various states of the printing mechanism section using a plurality of sensors. The detection result is transmitted to the CPU 101 via a sensor output detection circuit 126. Each time image printing is executed, the CPU 101 stores information about the size, a conveyance amount, and the sheet type of the used roll paper together with information about the date and time in the HDD 108 for each roll of the roll paper in the respective storage units.

Figure 2A:
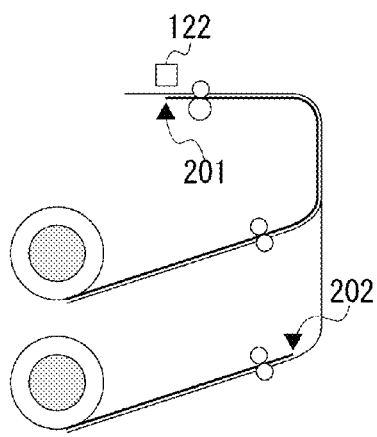
FIGS. 2A and 2B illustrate sheet switching according to the exemplary embodiment.
Figure 2B:
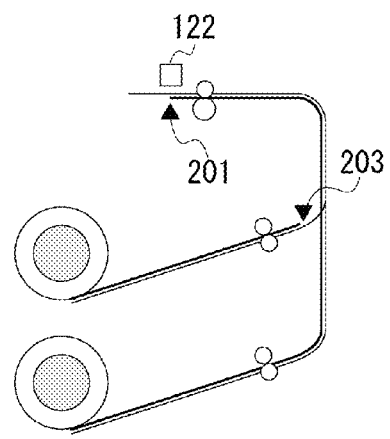

Next, switching of the roll paper for a print target in the paper conveyance mechanism (switching of the storage units for paper feeding) will be described. FIGS. 2A and 2B illustrate an overview of the paper conveyance mechanism illustrated in FIG. 1. As illustrated in FIGS. 2A and 2B, the rolls of roll paper set in the respective storage units are arranged vertically. A paper feeding target is switched by controlling a conveyance roller and the like. To simplify the description, the paper conveyance mechanisms for two rolls of roll paper are illustrated in FIGS. 2A and 2B. However, the present invention is not limited to two. Further, while not illustrated in FIGS. 2A and 2B, the paper conveyance mechanisms include a plurality of conveyance rollers for guiding the roll paper to a printing position 201 of the carriage 122. The roll paper is conveyed to the printing position 201 by rotation of the motor.

FIG. 2A illustrates a case in which the roll paper set in an upper level storage unit is selected as the roll paper for the print target. FIG. 2B illustrates a case in which the roll paper set in a lower level storage unit is selected as the roll paper for the print target.

The switching of the roll paper for the print target is performed based on an instruction from the CPU 101. When the roll paper for the print target is switched from the upper level to the lower level, first, the paper conveyance motor control circuit on the upper level rotates the motor in reverse to return the roll paper whose leading edge is conveyed to the printing position 201 to a retraction position 203. Then, when the leading edge of the roll paper on the upper level reaches the retraction position 203, the paper conveyance motor control circuit on the lower level conveys the leading edge of the roll paper on the lower level to the printing position 201. Subsequently, the carriage 122 performs scanning over the roll paper in a width direction, and repeats an operation to convey the roll paper by a predetermined length each time ink is discharged, so that an image is successively printed on the roll paper.

When the roll paper for the print target is switched from the lower level to the upper level, the opposite operation is performed. More specifically, first, the paper conveyance motor control circuit on the lower level rotates the motor in reverse to return the roll paper whose leading edge is conveyed to the printing position 201 to a retraction position 202. Then, when the leading edge of the roll paper on the lower level reaches the retraction position 202, the paper conveyance motor control circuit on the upper level conveys the leading edge of the roll paper on the upper level to the printing position 201. When three or more rolls of roll paper are simultaneously set in the respective storage units, the switching among them is performed in a similar manner.

As illustrated in FIGS. 2A and 2B, a conveyance distance of the roll paper to the printing position is different depending on the storage unit. The conveyance distance increases the lower down the roll paper is. However, depending on the printing mechanism and the conveyance mechanism, the vertical relationship may be reversed. Further, the rolls of roll paper do not have to be vertically arranged. Moreover, the image may be printed by feeding a sheet of cut paper to the printing position from any of the plurality of cassettes. Even when the paper is fed from a cassette, the conveyance distance to the printing position is different for each storage unit (cassette). Therefore, even when the cut paper set in the plurality of cassettes is used for printing, similar to the below-described roll paper case, the position for setting the cut paper may be determined by considering the conveyance distance to the printing position.

Next, processing for setting the roll paper in the storage unit of the printing control apparatus 100 will be described. FIG. 3 is a flowchart illustrating a processing flow when the user sets the roll paper in the storage unit of the printing control apparatus 100. The flowchart illustrates a processing flow in which the CPU 101 loads and executes a program stored in the ROM 103 into the RAM 102.

In step S301, the processing is started when processing for setting the roll paper in the storage unit of the printing control apparatus 100 is selected from the operation panel 106. Next, in step S302, a message such as "Roll paper usage history will be read. Specify a period." is displayed on the operation panel 106 to prompt the user to select the usage history period to be read. When the usage history period to be read is selected by the user from the operation panel 106, the processing proceeds to step S303. If the usage history period to be read is predetermined, or all of the usage history stored in the HDD 108 is read without specifying the period, the processing can proceed to step S303 without displaying the above message.

In step S303, the usage history of each roll of the roll paper for the selected period is read from the HDD 108. For example, when the selected period is one month, the CPU 101 calculates and determines an used amount of the roll paper in the conveyance direction (length used for printing) used during the one month period going back from the current date for each sheet type and size of the roll paper. Concerning the used amount, a cumulative total from when calculation is started until the current point may be stored in the HDD 108, and the cumulative total may be read along with the used amount.

Next, in step S304, based on the used amount which is determined for each sheet type and size of the roll paper in step S303, a message such as the "print setting" illustrated in FIG. 4 is displayed on the operation panel 106. The message may be, for example, for guiding the user to set the roll of the roll paper in the storage unit having a shorter conveyance distance in order of higher used amount thereof. Based on the displayed message, the user sets the roll paper in the printing control apparatus 100. However, since the message only recommends the set positions, the user does not have to exactly follow the recommendation. The user inputs the sheet type and size of the actually set roll paper from the operation panel 106, and the CPU 101 stores that input information in the ROM 103.

The example in FIG. 4 is a case in which the roll paper usage results stored in the HDD 108 of the printing control apparatus 100 indicate, as illustrated in an upper table of FIG. 4, four types of roll paper, specifically, A0 size plain paper, B0 size plain paper, A0 size glossy paper, and A0 size coated paper. Further, in the illustrated example, the amounts used in one month determined in step S303 (used amount in the conveyance direction) of the respective rolls are, 300 m, 100 m, 200 m, and 50 m, and the cumulative total is 4500 m, 200 m, 250 m, and 50 m.

As the message displayed in step S304, as illustrated in a lower diagram of FIG. 4, a message is displayed which recommends that the rolls of the roll paper are set from the upper level to the lower level in order of the roll paper whose amount used in one month is larger. In this example, since three rolls of the roll paper can be simultaneously set in the printing control apparatus 100, a message is displayed which guides the user to set three types of the roll paper in the rolls of the roll paper which have been used. In this example, although a roll paper storage unit 1 is set at the highest position (closest to the printing position and having the shortest conveyance distance), and the storage units from a roll paper storage unit 2 and below are set in order below that (further from the printing position and having a longer conveyance distance), some other arrangement may also be employed. For example, if the printing mechanism is at a lower portion, the conveyance distance decreases the lower the storage unit is. In either case, a message is displayed guiding the user to set the rolls of the roll paper in the storage units so that printing start is quicker for higher usage roll paper.

The flow illustrated in FIG. 3 is not limited to processing performed in the printing control apparatus 100. The flow can be realized by a printer driver, for example, in any of the host computers 151 to 153. In such a case, using the CPU, HDD, and RAM of the host computer, a printer driver program is read from the HDD, and loaded and executed in the RAM. Then, the host computer acquires information about the usage history and the like from the printing control apparatus 100, determines the paper feeding level for each roll of the roll paper to be set, and displays the message of step S304 on a display of the host computer.

Thus, when the user attempts to set the roll paper, the user can be guided in more efficient set positions for the roll paper which takes how long the print processing of a plurality of print jobs will take into consideration.

Figure 5:
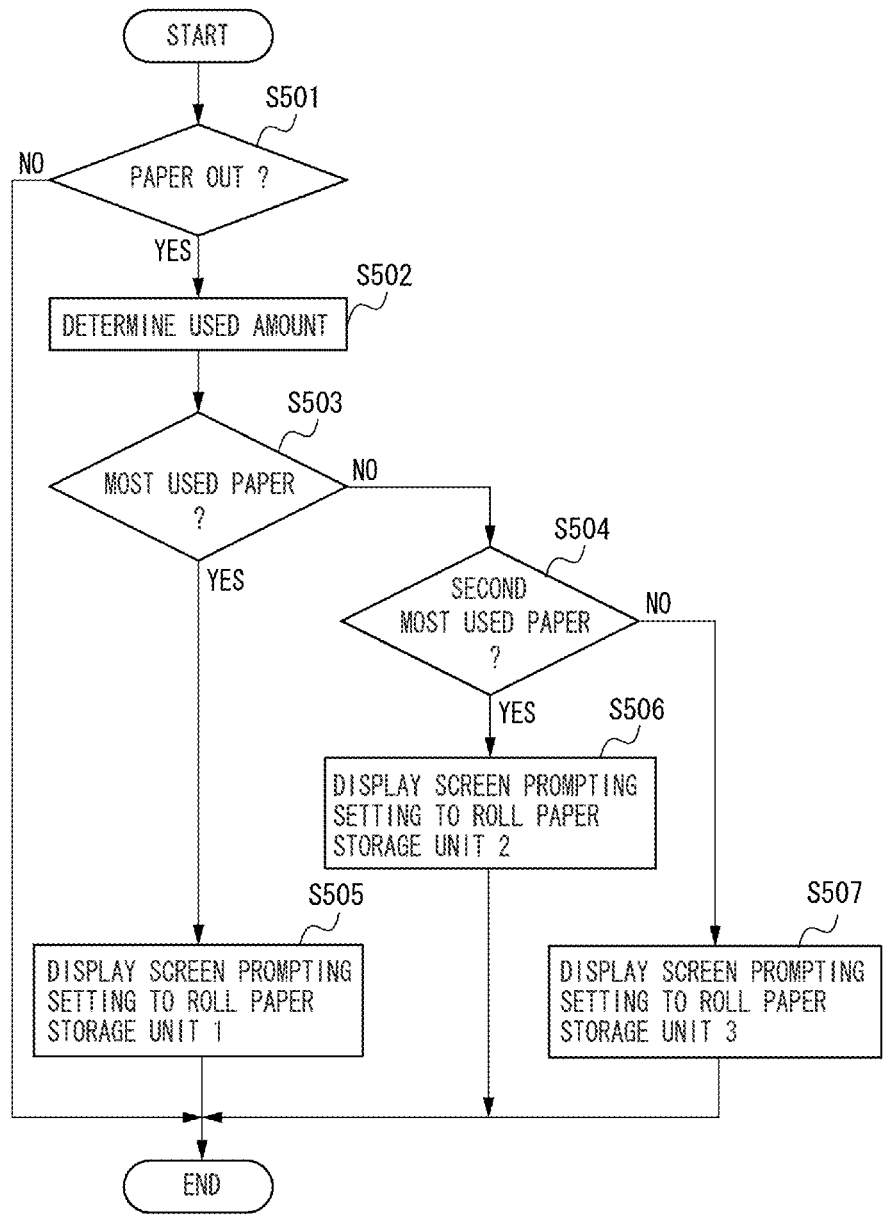
FIG. 5 is a flowchart illustrating a processing flow according to the exemplary embodiment.

Next, processing performed when any of the plurality of rolls of the roll paper set in the respective storage units of the printing control apparatus 100 runs out due to printing will be described. FIG. 5 is a flowchart illustrating a processing flow when any of the rolls of the roll paper set in the respective storage units of the printing control apparatus 100 runs out due to printing. Compared with the processing in FIG. 3, which is executed based on an instruction from the user regardless of whether the roll paper has run out or not, in FIG. 5 the processing is executed when it is determined that the roll paper has run out. The flowchart illustrates a processing flow in which the CPU 101 loads and executes a program stored in the ROM 103 into the RAM 102. FIG. 5 will also be described using an example in which the printing control apparatus 100 has three roll paper storage units.

In step S501, it is determined whether any one of the rolls of the roll paper set in the respective storage units of the printing control apparatus 100 has run out (paper out) due to printing. If it is determined that roll paper has run out (YES in step S501), the processing proceeds to step S502. In step S502, the used amount of each type of the roll paper is determined by reading the usage history of each roll paper from the HDD 108. Although in this example the used amount for a predetermined period is determined similar to the processing in FIG. 3, the cumulative total may be used without specifying the period.

In step S503, based on the determined used amount for each type of the roll paper, it is determined whether the size and the sheet type of the roll paper determined to have run out in step S501 are those of the roll paper which has the highest used amounts among the rolls included in the usage history. If it is determined that the size and the sheet type of the roll paper are those of the paper roll having the highest used amounts (YES in step S503), the processing proceeds to step S505. In step S505, a message is displayed on the operation panel 106 for recommending the user to set roll paper having the same size and sheet type as the roll paper in the roll paper storage unit 1 which has the shortest conveyance distance to the printing position. At this stage, the usage history of the other types of the roll paper may also be displayed. In some cases, another type of roll paper may already be set in the roll paper storage unit 1. In such a case, a message can be displayed prompting the user to reset the already set roll paper in another roll paper storage unit, or to set the roll paper which should be set this time in the roll paper storage unit 2, or if that is also in use, to a further down roll paper storage unit.

If it is determined in step S503 that the size and the sheet type of the run out roll paper are not those of the roll paper having the highest used amount among the rolls included in the usage history (NO in step S503), the processing proceeds to step S504. In step S504, based on the usage history, it is determined whether the used amount of the run out roll paper is the second highest. If it is determined that the used amount is the second highest (YES in step S504), the processing proceeds to step S506. In step S506, a message is displayed on the operation panel 106 for recommending the user to set roll paper having the same size and sheet type as the roll paper in the roll paper storage unit 2. At this stage, the usage history of the other types of the roll paper may also be displayed. If the roll paper with the size and sheet type which has the highest usage amount is not set in the roll paper storage unit 1, a message can be displayed prompting the user to reset the roll paper in the roll paper storage unit 1. Further, if another type of the roll paper is already set in the roll paper storage unit 2, a message can be displayed prompting the user to set the already set roll paper in another roll paper storage unit, or to set the roll paper which is the target this time in a roll paper storage unit 3.

If it is determined in step S504 that the size and the sheet type of the run out roll paper are not those of the roll paper which has the second highest used amount among the rolls included in the usage history (NO in step S504), the processing proceeds to step S507. In step S507, a message is displayed on the operation panel 106 for recommending the user to set the roll paper in the roll paper storage unit 3 which has the longest conveyance distance to the printing position. At this stage, the usage history of the other types of the roll paper may also be displayed. Further, a message may be displayed for recommending the user to replace the rolls of the roll paper already set in the respective storage units as needed.

The flow illustrated in FIG. 5 is not limited to processing performed in the printing control apparatus 100. The flow can be realized by the printer driver, for example, in any of the host computers 151 to 153. In such a case, using the CPU, HDD, and RAM of the host computer serving as the printing control apparatus, the printer driver program is read from the HDD, and loaded and executed in the RAM. Then, the host computer acquires information about the usage history and the like from the printing control apparatus 100, determines the storage unit in which each roll of the roll paper to be set, and displays the messages of steps S505 to S507 on the display of the host computer.

In addition to a case in which paper has run out, the flow of FIG. 5 may be applied to newly resetting the roll paper, such as when a jam has occurred. Thus, when the roll paper needs to be set, the user can be guided in more efficient set positions for the roll paper.

The above example merely presents to the user a recommended set position for the roll paper. The recommended set position is not compulsory. For example, in addition to the recommended set position, information such as the usage history and a reason for the recommendation may be presented to allow the user to determine which set position to use. Further, if the usage history displayed at this stage includes both the used amount for a specific period (e.g. one month) and the cumulative total, the user can compare the amount used recently with the cumulative total, thus allowing the situation to be more accurately determined.

In the above, an example is described in which one type (size and sheet type) of roll paper is set in one roll paper storage unit. However, setting high usage type roll paper in a plurality of the roll paper storage units enables the user to reduce frequency of replacement operations. Reducing the replacement frequency of the roll paper performed by the user also allows printing downtime of the printing control apparatus 100 to be decreased. Below, examples will now be described in which the user is guided to set high usage type roll paper in the plurality of the roll paper storage units.

Figure 6:
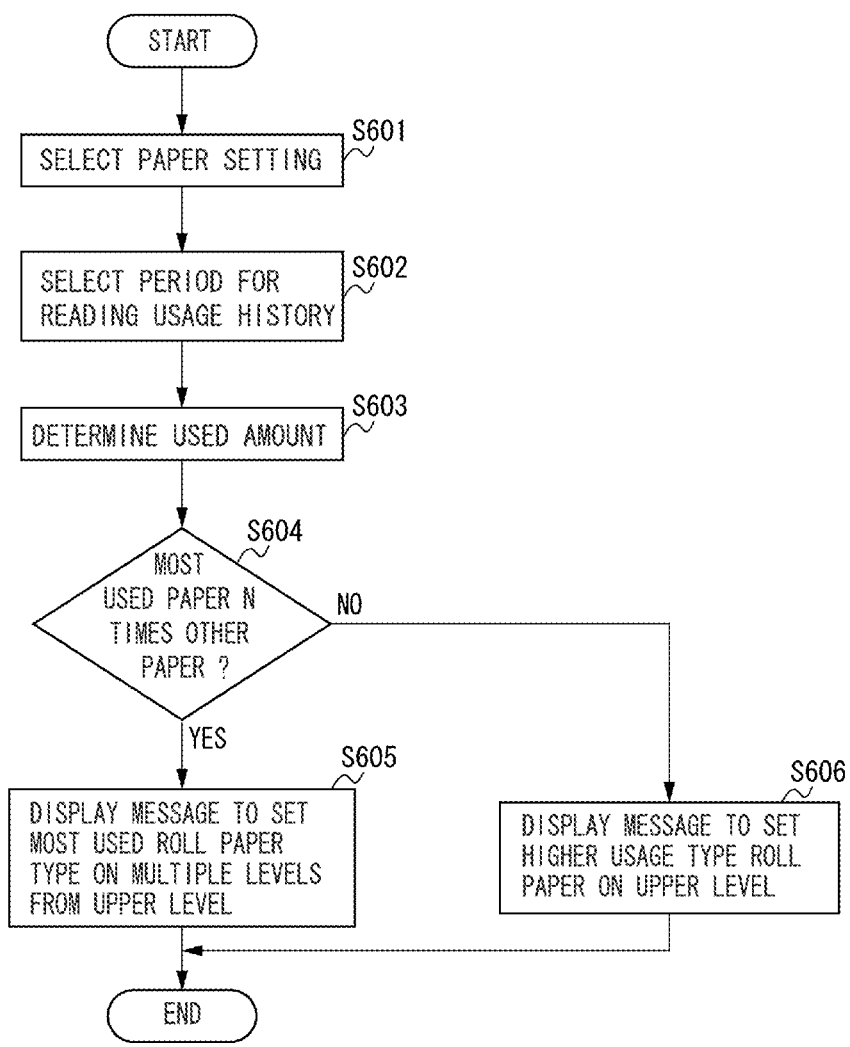
FIG. 6 is a flowchart illustrating a processing flow according to the exemplary embodiment.

FIG. 6 is a flowchart illustrating a processing flow which, in the above described processing of FIG. 3, recommends the user to set a type of roll paper having a used amount equal to or above a predetermined amount in the plurality of the roll paper storage units. The flowchart illustrates a processing flow in which the CPU 101 loads and executes the program stored in the ROM 103 into the RAM 102. Further, when the processing is executed on the host computer side, the processing can be executed using the CPU, HDD, and RAM of the host computer by reading the printer driver program from the HDD and loading the read program into the RAM.

In steps S601 to S603, the same processing is performed as steps S301 to S303, and thus a description thereof will be omitted here.

In step S604, based on the used amount determined for each sheet type and size of roll paper in step S603, it is determined whether the used amount of the roll paper type with the highest used amount is N times or more greater than the used amount of the other types of roll paper. N is an arbitrary positive integer which may be set as appropriate. If it is determined that the used amount of the roll paper type with the highest used amount is N times or more greater than the used amount of the other types of roll paper (YES in step S604), a message is displayed on the operation panel 106 for recommending the user to set this type of roll paper in a plurality of the storage units (roll paper storage units) from the upper level (the storage unit having the shortest conveyance distance to the printing position). On the other hand, if it is determined that the used amount of the roll paper type with the highest used amount is not N times or more greater than the used amount of the other types (NO in step S604), the processing proceeds to step S606. In step S606, the same processing as in step S304 is performed.

Consequently, based on past usage history, a high usage roll paper type can be set in the plurality of the storage units having a shorter conveyance distance to the printing position, thereby allowing efficiency to be improved.

Figure 7:
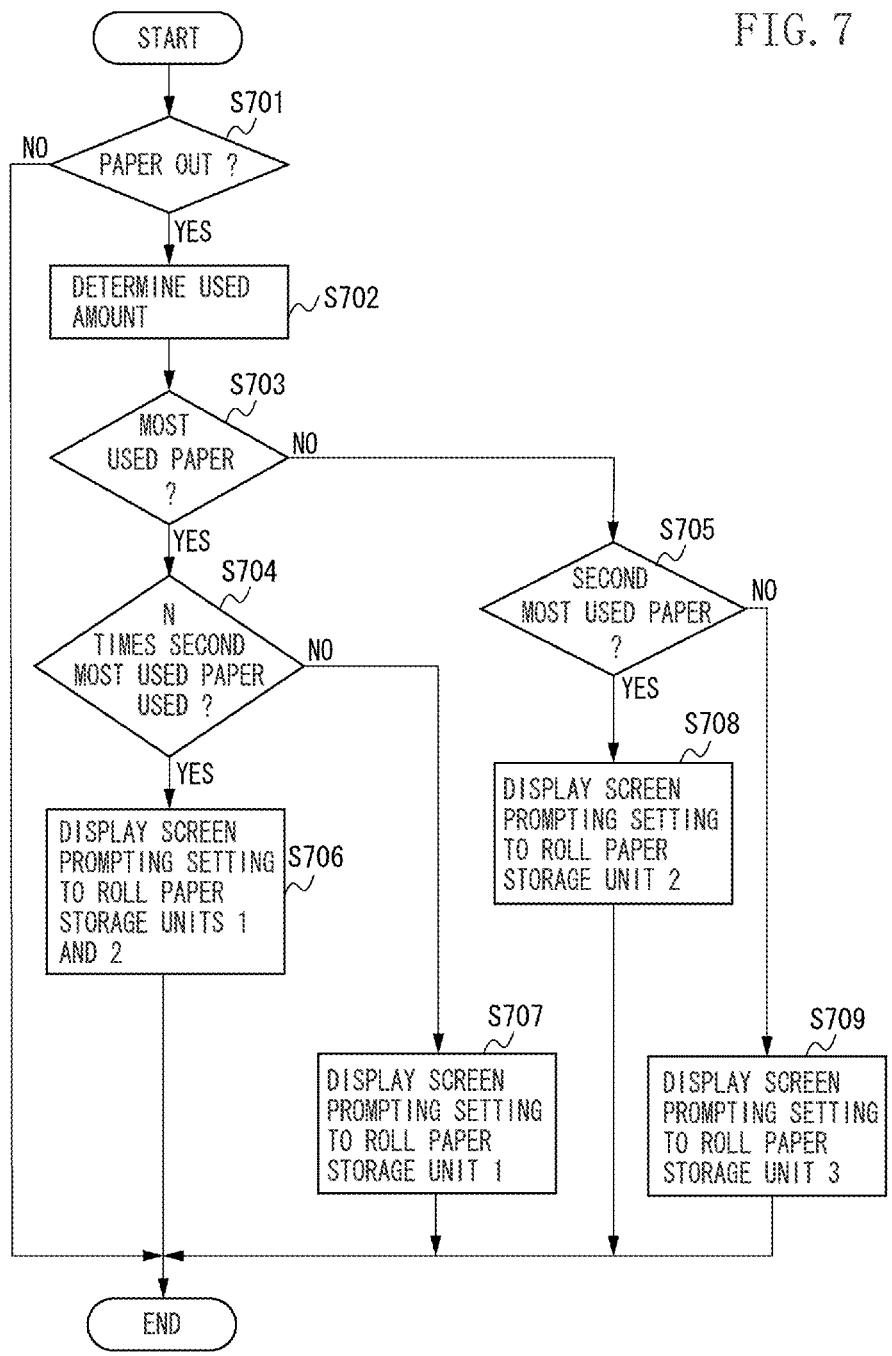
FIG. 7 is a flowchart illustrating a processing flow according to the exemplary embodiment.

FIG. 7 is a flowchart illustrating a processing flow which, in the above described processing of FIG. 5, recommends the user to set a type of roll paper having a used amount equal to or above a predetermined amount in the plurality of the roll paper storage units. The flowchart illustrates a processing flow in which the CPU 101 loads and executes the program stored in the ROM 103 into the RAM 102. Further, when the processing is executed on the host computer side, the processing can be executed using the CPU, HDD, and RAM of the host computer by reading the printer driver program from the HDD and loading the read program into the RAM.

In steps S701 to S703, the same processing is performed as steps S501 to S503, and thus a description thereof will be omitted here.

In step S704, it is determined whether the used amount of the roll paper type with the highest used amount is N times or more greater than the used amount of the roll paper type determined to have the second highest used amount. If it is determined that the used amount of the roll paper type with the highest used amount is N times or more greater than that of the second highest roll paper type (YES in step S704), a message is displayed on the operation panel 106 for recommending the user to set this type of roll paper in the both roll paper storage units 1 and 2. On the other hand, if it is determined that the used amount of the roll paper type with the highest used amount is not N times or more greater than that of the second highest roll paper type (NO in step S704), the processing proceeds to step S707. In step S707, the same processing as in step S505 is performed.

In steps S705, S708, and S709, the same processing is performed as steps S504, S506, and S507, and thus a description thereof will be omitted here.

Consequently, when paper runs out, based on past usage history, a high usage roll paper type can be set in the plurality of the storage units having a shorter conveyance distance to the printing position, thereby allowing efficiency to be improved. In addition to a case in which paper has run out, the flow of FIG. 7 may also be applied to various other cases, such as when a jam occurs as described above, or when the user instructs setting of the paper as in FIG. 3 or 4. In the above example, although determination is made based on whether the highest used amount is N times or more greater than the used amounts of the other roll paper types as a guide for determining a high used amount, the present invention is not limited to this. N does not have to be an integer, and the determination may be made based on other conditions.

Thus, according to the present exemplary embodiment, when a user sets a recording medium such as roll paper in any of a plurality of storage units, a message guides the user which storage unit to set the roll paper in based on a usage history of the recording medium and a conveyance distance to a printing position of the respective storage units. Consequently, the recording medium can be set in the storage unit which enables efficient printing to be executed.

In the above example, the length in the conveyance direction of the recording medium used for printing is used as the used amount. However, other values can be applied to the present invention. For example, if considering the time it takes to pull out and rewind the recording medium, the number of pull outs and rewinds may be considered. More specifically, if performing processing in which a sheet is pulled out after being rewound between print jobs, the number of print jobs per sheet type may be used as an above printing history. Further, the number of rewinds and pull outs may be used as the used amount. Furthermore, the cumulative length of reversely rotating the conveyance mechanism may be used as the used amount.

Further, although the above example is described using two factors, the sheet width (size) and sheet type, to determine the type of the roll paper stored as the printing history, either of these may be used alone. For example, if the printing control apparatus 100 is only capable of using a roll paper with a fixed sheet width, type information may include just the sheet type (plain paper, glossy paper, film, cloth etc.). If the printing control apparatus 100 is only capable of using a specific sheet type, the type information may include just the sheet size. If the recording medium to be used in printing is cut paper, the sheet size is specified by vertical and horizontal lengths, and the printing history may be the number of used sheets for each sheet type. Further, these or other factors may be combined to determine the sheet type.

As described above, the object of the present invention may also be achieved by supplying a storage medium on which a software program code for realizing the functions of the above exemplary embodiment is stored to a system or an apparatus, and having a computer (or a CPU or a micro processing unit (MPU)) of the system or apparatus read and execute the stored program code. In this case, the program code itself read from the storage medium realizes the novel functions of the present invention, so that the storage medium on which the program code is stored constitutes another embodiment according to the present invention. Therefore, as long as it has the function of a program, a form of the program is not limited, and may be an object code, a program executed by an interpreter, script data supplied to an operating system (OS) and the like.

The program executed by the printing control apparatus 100 or the host computers 151 to 153 may be executed by one CPU or by a plurality of CPUs linked together. Further, the processing may be executed by appropriately combining software and hardware. In addition, instead of executing the program by the CPU in the printing control apparatus, the program may be executed by a CPU in an apparatus provided externally to the printing control apparatus.

Further, a part of all of the processing executed by the program may be replaced with hardware (e.g., an electric circuit).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-143527 filed Jun. 16, 2009, which is hereby incorporated by reference herein in its entirety.

What is claimed is:

1. A printing control apparatus for printing an image on a type of recording medium of a plurality of types of recording mediums set in any of a plurality of storage units, in which conveyance distances of a recording medium to a printing position are different from each other, by conveying the recording medium to the printing position, the printing control apparatus comprising:
a first determination unit configured to determine a cumulative used amount for each type of recording medium;
a second determination unit configured to determine, if a recording medium set in any one of the plurality of the storage units has run out, whether a cumulative used amount for a type of the recording medium which has run out is larger than a cumulative used amount for a different type of recording medium among the plurality of types of recording mediums determined by the first determination unit, based on the cumulative used amounts determined by the first determination unit; and
a control unit configured to guide an operator to set the type of recording medium which has run out, to a storage unit among the plurality of storage units, so that a higher used type of recording medium among the plurality of types of recording mediums is set in a storage unit having shorter conveyance distance of the recording medium to the printing position among the plurality of the storage units based on a determination result by the second determination unit.

2. The printing control apparatus according to claim 1, wherein the control unit is configured to guide an operator if the operator instructs the recording medium to be set.

3. The printing control apparatus according to claim 1, wherein the first determination unit is configured to determine the cumulative used amount for a predetermined period and the control unit is configured to guide an operator to set the type of recording medium based on the cumulative used amount for a predetermined period.

4. A method for printing an image on a type of recording medium of a plurality of types of recording mediums set in any of a plurality of storage units, in which conveyance distances of a recording medium to a printing position are different from each other, by conveying the recording medium to the printing position, the method comprising:
first determining a cumulative used amount for each type of recording medium;
second determining, if a recording medium set in any one of the plurality of the storage units has run out, whether a cumulative used amount for a type of the recording medium which has run out is larger than a cumulative used amount for a different type of recording medium among the plurality of types of recording mediums determined in the first determining, based on the determined cumulative used amounts; and
guiding an operator to set a recording medium which has run out so that a higher used type of recording medium among the plurality of types of recording mediums is set in a storage unit having shorter conveyance distance of the recording medium to the printing position among the plurality of the storage units based on a result of the second determining,
wherein a memory and a processor coupled to the memory implement the first determining, the second determining and the guiding steps.

5. A non-transitory computer-readable storage medium storing computer-executable instructions for executing a method for printing an image on a type of recording medium of a plurality of types of recording mediums set in any of a plurality of storage units, in which conveyance distances of a recording medium to the printing position are different from each other, by conveying the recording medium to the printing position, the method comprising:
first determining a cumulative used amount for each type of recording medium;
second determining, if a recording medium set in any one of the plurality of the storage units has run out, whether a cumulative used amount for a type of the recording medium which has run out is larger than a cumulative used amount for a different type of recording medium among the plurality of types of recording mediums determined in the first determining, based on the determined cumulative used amounts; and
guiding an operator to set a recording medium which has run out to a storage unit among the plurality of storage units, so that a higher used type of recording medium among a plurality of types of recording mediums is set in a storage unit having shorter conveyance distance of the recording medium to the printing position among the plurality of the storage units based on a result of the second determining.

6. The printing control apparatus according to claim 1, wherein the control unit guides an operator to set a recording medium in order by controlling a display device to display information for guiding an operator to set a higher used type of recording medium among the plurality of types of recording mediums in a storage unit having a shorter conveyance distance to the printing position.

7. The printing control apparatus according to claim 6, wherein the control unit controls the display device to display at least one of the cumulative used amount for a predetermined period and a cumulative total.

8. The printing control apparatus according to claim 1, further comprising a third determination unit configured to determine whether the cumulative used amount of a high usage type recording medium is N times or more greater than the cumulative used amounts of the other types of recording medium,
wherein the control unit guides an operator to set a highest used type of recording medium among the plurality of types of recording mediums in a plurality of the storage units from the storage unit in which a conveyance distance of the recording medium to the printing position is the shortest, if the third determination unit determines that the used amount of a high usage type recording medium is N times or more.

9. The printing control apparatus according to claim 1, wherein the control unit guides an operator to set a plurality of types of recording mediums among types of recording mediums which have been used in the plurality of the storage units.

10. The printing control apparatus according to claim 1, wherein the recording medium set in any of the plurality of the storage units is a continuous sheet.

11. The printing control apparatus according to claim 10, wherein the cumulative used amount is a length of a recording medium used for printing.

12. The printing control apparatus according to claim 1, wherein the control unit is configured to guide an operator to set the type of recording medium which has run out and notify a usage history of each type of recording medium.

13. The printing control apparatus according to claim 1, wherein the control unit is configured to guide, if one of the other types of recording mediums is set in a storage unit in which the type of recording medium which has run out is to be set, the operator to set the one of the other types of recording medium in another storage unit among the plurality of storage units.

14. The printing control apparatus according to claim 1, further comprising a printing unit.

15. A printing control apparatus for printing an image on a type of recording medium of a plurality of types of recording mediums set in any of a plurality of storage units, in which conveyance distances of a recording medium to a printing position are different from each other, by conveying the recording medium to the printing position, the printing control apparatus comprising:
a determination unit configured to determine a cumulative used amount for each type of recording medium; and
a control unit configured to guide, if a recording medium set in any one of the plurality of storage unit is to be replaced, an operator to set a type of recording medium among a plurality of types of recording mediums, for which a cumulative used amount has been determined by the determination unit, in a storage unit among the plurality of storage units, in such an order that a type of recording medium having a higher cumulative used amount is set in a storage unit having a shorter conveyance distance of the recording medium to the printing position among the plurality of the storage units based on a determination result determined by the determination unit.

16. A method for printing an image on a type of recording medium of a plurality of types of recording mediums set in any of a plurality of storage units, in which conveyance distances of a recording medium to a printing position are different from each other, by conveying the recording medium to the printing position, the method comprising:
determining a cumulative used amount for each type of recording medium; and
guiding an operator to set a recording medium among a plurality of types of recording mediums, for which a cumulative used amount has been determined, in a storage unit among the plurality of storage units, in such an order that a type of recording medium having a higher cumulative used amount is set in a storage unit having a shorter conveyance distance of the recording medium to the printing position among the plurality of the storage units based on a result of determination whether a cumulative amount is large,
wherein a memory and a processor coupled to the memory implement the determining and the guiding steps.

17. A non-transitory computer-readable storage medium storing computer-executable instructions for executing a method for printing an image on a type of recording medium of a plurality of types of recording mediums set in any of a plurality of storage units, in which conveyance distances of a recording medium to a printing position are different from each other, by conveying the recording medium to the printing position, the method comprising:
determining a cumulative used amount for each type of recording medium; and
guiding an operator to set a recording medium among the plurality of types of recording mediums, for which the cumulative used amount has been determined, to a storage unit among the plurality of storage units, the cumulative used amount for the type of recording medium being determined, in such an order that a type of recording medium having a higher cumulative used amount is set in a storage unit having a shorter conveyance distance of the recording medium to the printing position among the plurality of the storage units based on a result of determination whether a cumulative amount is large.

18. The printing control apparatus according to claim 15, wherein the control unit guides an operator if the operator instructs the recording medium to be set.

19. The printing control apparatus according to claim 15, wherein the first determination unit is configured to determine the cumulative used amount for a predetermined period and the control unit is configured to guide an operator to set the type of recording medium based on the cumulative used amount for a predetermined period.

20. The printing control apparatus according to claim 15, wherein the recording medium set in any of the plurality of the storage units are continuous sheets.

21. The printing control apparatus according to claim 20, wherein the cumulative used amount is a length of recording medium used for printing.

22. The printing control apparatus according to claim 15, further comprising a printing unit.

* * * * *